(12) United States Patent
Amarnath et al.

(10) Patent No.: US 10,853,201 B1
(45) Date of Patent: Dec. 1, 2020

(54) BACKING UP FILES STORING VIRTUAL MACHINES

(71) Applicant: EMC Corporation, Hopkinton, MA (US)

(72) Inventors: Mohan Amarnath, Karnataka (IN); Chandrakantha Nagaraja, Karnataka (IN); C. Rakesh Kumar, Karnataka (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 161 days.

(21) Appl. No.: 14/594,011

(22) Filed: Jan. 9, 2015

(51) Int. Cl.
*G06F 11/14* (2006.01)
*G06F 11/20* (2006.01)
*G06F 9/455* (2018.01)

(52) U.S. Cl.
CPC ...... *G06F 11/1484* (2013.01); *G06F 9/45533* (2013.01); *G06F 11/1451* (2013.01); *G06F 11/2038* (2013.01); *G06F 11/2048* (2013.01); *G06F 2201/80* (2013.01); *G06F 2201/84* (2013.01)

(58) Field of Classification Search
CPC ............. G06F 11/2038; G06F 11/2048; G06F 9/45533; G06F 9/45558; G06F 2201/815; G06F 2201/84
See application file for complete search history.

(56) References Cited

U.S. PATENT DOCUMENTS

| | | | | |
|---|---|---|---|---|
| 8,930,315 | B2* | 1/2015 | Chandhok | G06F 11/1458 707/640 |
| 2010/0011178 | A1* | 1/2010 | Feathergill | G06F 11/1466 711/162 |
| 2013/0227558 | A1* | 8/2013 | Du | G06F 9/45558 718/1 |
| 2013/0339643 | A1* | 12/2013 | Tekade | G06F 17/30581 711/162 |
| 2014/0095816 | A1* | 4/2014 | Hsu | G06F 3/0655 711/162 |
| 2014/0215461 | A1* | 7/2014 | Laor | G06F 9/45533 718/1 |
| 2016/0070623 | A1* | 3/2016 | Derk | G06F 11/1469 714/6.23 |

* cited by examiner

*Primary Examiner* — Jigar P Patel
(74) *Attorney, Agent, or Firm* — Dergosits & Noah LLP; Todd A. Noah (57) ABSTRACT

Backing up files storing virtual machines is described. A system identifies a file storing multiple virtual machines. The system creates a backup of the file. The system identifies a failure of the file. The system restores the multiple virtual machines based on the backup of the file.

20 Claims, 4 Drawing Sheets

BACKING UP FILES STORING VIRTUAL MACHINES

BACKGROUND

If a software error corrupts a computer's data set, or if erroneous data updates the data set, a data protection administrator may restore the data set to a previous uncorrupted state that does not include the corrupted or erroneous data. A backup application executes a backup operation either occasionally or continuously to enable this restoration, storing a copy of each desired data set state (such as the values of its data and these values' embedding in the data set's data structures) within dedicated backup files. When the data protection administrator decides to return the data set to a previous state, the data protection administrator specifies the desired previous state by identifying a desired point in time when the data set was in this state, and instructs the backup application to execute a restore operation to restore a copy of the corresponding backup files for that state to the data set.

A virtual machine is a software implementation of a computer that executes programs like a physical machine. A system virtual machine provides a complete system platform which supports the execution of a complete operating system, and usually emulates an existing architecture. Multiple instances of virtual machines lead to more efficient use of computing resources, both in terms of energy consumption and cost effectiveness, known as hardware virtualization, the key to a cloud computing environment. Similar to other data sets, backup copies are made of a virtual machine's data set to enable a restoration of the virtual machine's data set in the event of corruption or an erroneous update to the virtual machine's data set.

DETAILED DESCRIPTION

Previous backup and restore applications backed up a data set for a virtual machine on an individual virtual machine basis. If a file that stored multiple virtual machines' data sets failed, the backup and restore application restored the data sets for the multiple virtual machines on an individual virtual machine basis. For example, a backup policy backed up a first virtual machine on a daily basis, backed up a second virtual machine on a weekly basis, and did not back up a third virtual machine. For this example, a failure of the file that stored the data sets for the three virtual machines may result in restoring the first virtual machine based on yesterday's backup, restoring the second virtual machine based on last week's backup, and not restoring the third virtual machine, thereby losing a week's worth of changes for the second virtual machine and losing all of the changes for the third virtual machine.

Embodiments herein back up files storing virtual machines. A file storing multiple virtual machines is identified. A backup of the file is created. A failure of the file is identified. The multiple virtual machines are restored based on the backup of the file.

For example, a backup and restore application scans the storage bus for a server that manages virtual machines, and identifies a data store that stores multiple virtual machines' files. The backup and restore application creates backups of the data store based on a user-defined policy by using change block tracking to create backup blocks for each of the changed blocks of the multiple virtual machines' files. The backup and restore application identifies a failure of the data store based on file system corruption. The backup and restore application responds to a single user click by using the backup of the data store to restore all of the multiple virtual machines to another data store. The backup and restore application is able to restore all of the virtual machines stored in the data store based on the most recent backup of the data store, even if a virtual machine stored in the data store was covered by a backup policy which backed up the virtual machine a long time ago or even if the virtual machine was not registered by any backup policy for an individual virtual machine.

Figure 1:
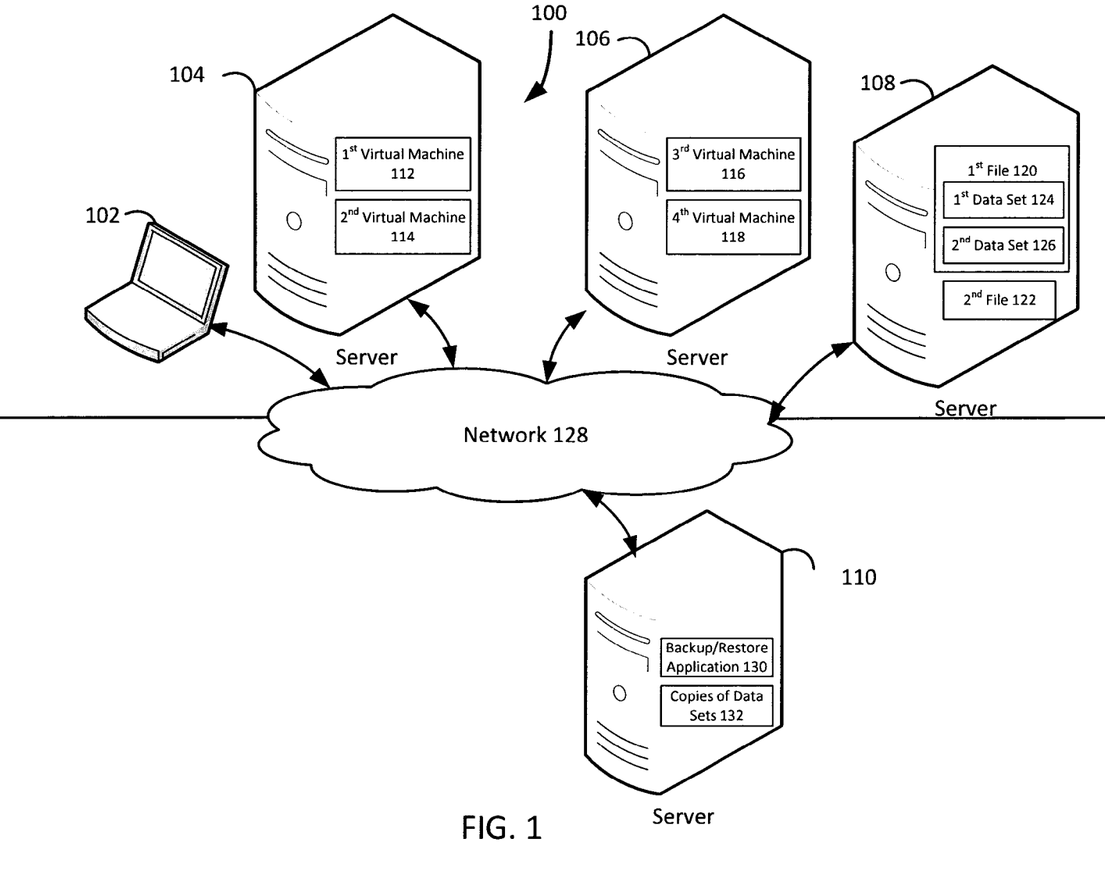
FIG. 1 illustrates a block diagram of an example system for backing up files storing virtual machines.

FIG. 1 illustrates a block diagram of a system that implements backing up files storing virtual machines, under an embodiment. As shown in FIG. 1, system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

Figure 2:
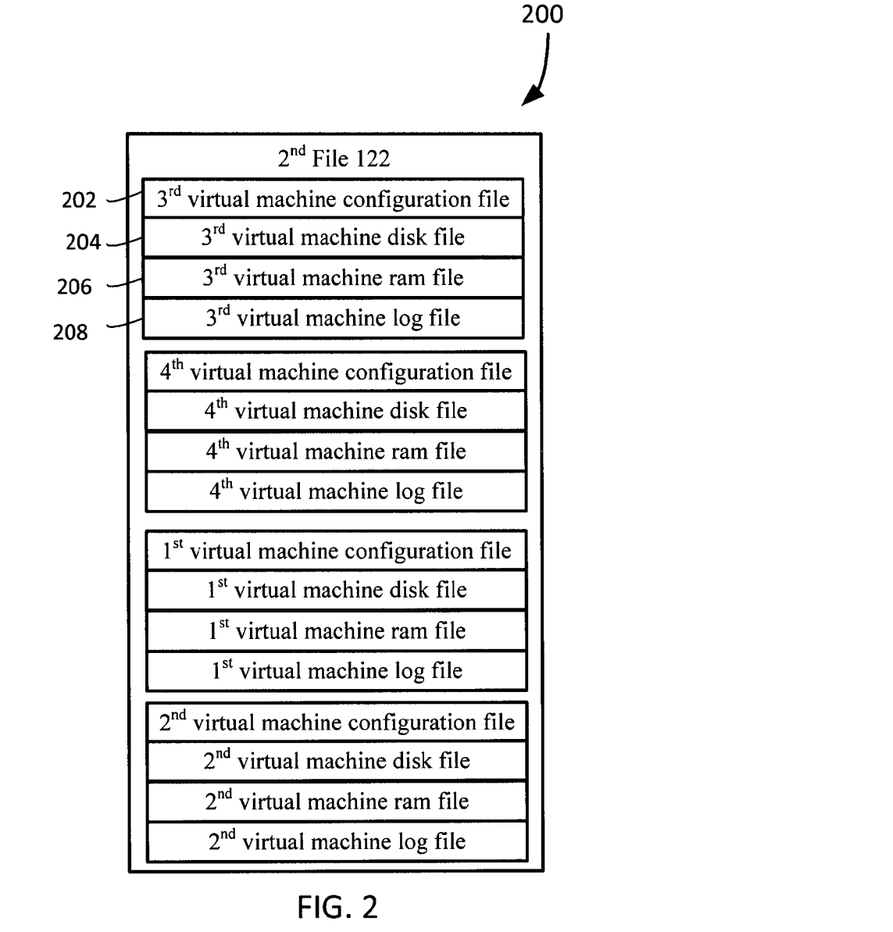
FIG. 2 is a simplified example of a data store that stores virtual machines files, under an embodiment.

In an embodiment, the system 100 represents a cloud computing system that includes a first client 102, a second client 104, a third client 106, and a fourth client 108; and a server 110 that may be provided by a hosting company. The first client 102 may be a laptop computer, the second client 104 may be a computer capable of hosting multiple virtual machines, such as a first virtual machine 112 and a second virtual machine 114, and the third client 106 may be a computer capable of hosting multiple virtual machines, such as a third virtual machine 112 and a fourth virtual machine 114. The fourth client 108 may be a computer capable of storing a first file 120 and a second file 122, and the first file 120 may store a first data set 124 for the first virtual machine 112 and a second data set 126 for the second virtual machine 112. The first file 120 and the second file 122 may be referred to as the first data store 120 and the second data store 122 because some providers of virtualization software and services, such as VMware®, refer to files which store virtual machines' files as data stores. Examples of data stores are depicted in FIG. 2 and described below in reference to FIG. 2. The clients 102-108 and the server 110 communicate via a network 128. The server 110 includes a backup/restore application 130, and copies of data sets 132. Although following paragraphs describe EMC Corporation's Avamar® backup/restore application and EMC Corporation's NetWorker® backup/restore application as examples of the backup/restore application 130, the backup/restore application 130 may be any other backup/restore application which provides the backup/restore functionalities described in the Background section.

Although FIG. 1 depicts the system 100 with four clients 102-108, one server 110, four virtual machines 112-118, two files 120-122, two data sets 124-126, one network 128, one backup/restore application 130, and one copies of data sets 132, the system 100 may include any number of clients 102-108, any number of servers 110, any number of virtual machines 112-118, any number of files 120-122, any number of data sets 124-126, any number of networks 128, any number of backup/restore applications 130, and any number of copies of data sets 132. Although FIG. 1 depicts the files 120-122 residing completely on the fourth client 108 and depicts the backup/restore application 130 and the copies of data sets 132 residing completely on the server 110, the files 120-122, the backup/restore application 130, and the copies of data sets 132 may reside completely on any of the clients 102-108, completely on the server 110, completely on another server that is not depicted in FIG. 1, or in any combination of partially on the clients 102-108, partially on the server 110, and partially on the other server that is not depicted. The clients 102-108 and the server 110 may each be substantially similar to the system 400 depicted in FIG. 4 and described below.

The backup/restore application 130 may protect the data sets for the virtual machines 112-118 by triggering a scheduled backup on the files 120-122 and storing various copies of the data sets 124-126 in the copies of data sets 132. A data protection administrator may use the backup/restore application 130 to specify a priority for storing copies of data sets on destination nodes, such as storing only on disks, or storing on disks before storing on a combination of disks and tapes. Additionally, a data protection administrator may use the backup/restore application 130 to specify the options for data to be encrypted, deduplicated, and/or compressed while being transmitted from a source, and the options for data to be decrypted and/or decompressed when stored on a destination. Data deduplication significantly reduces backup time by only storing unique periodic changes, while always periodically maintaining full backups for immediate single-step restore. The transmission of deduplicated backup sends only changed blocks, thereby reducing network traffic. The copies of data sets 132 may be based on checkpoints that the backup/restore application 130 creates at regular intervals. The backup/restore application 124 may automatically roll back a copy of a data set to a certain checkpoint during a power up if the preceding shutdown of the corresponding client was abnormal. Furthermore, a data protection administrator may select to execute a manual rollback to a certain checkpoint selected by the data protection administrator.

Data protection administrators may use the backup/restore application 130 to generate a specific policy based on the specific needs of a customer, and reuse that policy for customers with similar needs. For example, a data protection administrator may use the backup/restore application 130 to generate a "gold" policy, a "platinum" policy, and a "silver" policy for VMware® clients. The gold policy can specify to store 2 backup copies for each VMware® client onto a first disk for 6 months, store a clone of the backup copies on a second disk for 1 year, and store a secondary clone of the backup copies on a tape for 5 years. In this example, the data protection administrator that used the backup/restore application 130 to generate the gold policy for a specific set of VMware® clients may later apply another instance of the same gold policy to a different set of VMware® clients. Similarly, the data protection administrator may apply another instance of the same platinum policy to a different set of VMware® clients. The backup/restore application 130 may provide full enterprise level protection of data for all of an enterprise's virtual machines.

The backup and restore application 130 may have an integrated data store backup mechanism which includes a data store scanner, a data store backup policy engine, and a backup decision engine. The backup and restore application 130 may use the data store scanner to scan the storage bus for the fourth client 108 that manages the virtual machines 112-118, and identify the first file 120, or the first data store 120, that stores the first data set 124 for the first virtual machine 112 and that stores the second dataset 126 for the second virtual machine 114. The data store scanner may probe the data store inventory of any server which manages virtual machines by identifying every underlying file system attached to the server, and maintain a list of all data stores associated with the server(s). The data store scanner may rescan the storage bus of such a server to get the latest data store information and present this information to a user device, such as the first client 102, before the data store backup policy engine enables a user to define a new data store backup policy or redefine an existing data store backup policy. Although the following example describes further processes based on identifying the first file 120, or the first data store 120, the backup and restore application 130 may use the data store scanner to scan and identify any number of data stores which the backup and restore application 130 may further process.

The backup and restore application 130 may create backups of the first file 120, or the first data store 120, based on a user-defined policy created via the data store backup policy engine. Each data store backup policy may be performed manually and/or triggered by the system 100. One example of a user-defined policy is for creating a backup of the first file 120, or the first data store 120, when the backup decision engine determines that the first file 120, or the first data store 120, comes on line. The backup and restore application 130 may create full or incremental backups of the first file 120, or the first data store 120. A system-triggered backup may be initiated depending on a threshold level of data change. For example, a data store backup policy may be triggered when the system 100 determines that a threshold number of blocks are changed for the first data set 124 for the first virtual machine 112 and the second dataset 126 for the second virtual machine 114. In response, the backup decision engine triggers the backup and restore application 130 to create backups of the first file 120, or the first data store 120, by using change block tracking to create backup blocks for each of the changed blocks of the first data set 124 for the first virtual machine 112 and the second dataset 126 for the second virtual machine 114. Using change block tracking minimizes the load on the backup and restore application 130, and therefore the system 100.

The backup and restore application 130 may identify a failure of the first file 120, or the first data store 120, due to file system corruption, a host failure, a network outage, a storage disk failure, an array failure, an application failure, or any other reason or combinations of reasons. The backup and restore application 130 may respond to a single user click via the first client 102 by using the backup of the first file 120, or the first data store 120, stored in the copies of data sets 132 to restore the data sets 124-126 for the virtual machines 112-114 to the second file 122, or the second data store 122. If a user does not specifically select a data store, the backup and restore application 130 may use the data store which originally stored the data sets as a default data store for restoring the data sets. If a user specifies to restore data sets for virtual machines to a data store that is not the data store which originally stored the data sets, the backup and restore application 130 determines whether the new data store has sufficient capacity for storing the data sets to be restored. If not, the backup and restore application 130 notifies the user about the lack of storage capacity, and may present various alternatives for restoring the data sets to data stores which individually or collectively have the required capacity.

The backup and restore application 130 may create restore points after each successful backup process, which may enable a user to select a restore point via the first client 102, thereby directing the backup and restore application 130 to restore the data sets for virtual machines based on any selected restore point. If a user does not specifically select a restore point via the first client 102, the backup and restore application 130 may use the most recent restore point as a default restore point. The backup and restore application 130 may identify the size of the backed up data store to a user via the first client 102, which enables the user to select a data store with sufficient capacity for restoring the data sets. The backup and restore application 130 is able to restore all of the virtual machines stored in a data store based on the most recent backup of the data store, even if a virtual machine stored in the data store was covered by a backup policy which backed up the virtual machine a long time ago or even if the virtual machine was not registered by any backup policy for an individual virtual machine.

Although the following paragraph describes EMC Corporation's Avamar® backup/restore application as an example of the backup/restore application 130, the backup/restore application 130 may be any other backup/restore application which provides the backup/restore functionalities described in the Background section. The backup/restore application 130 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

Although the following paragraph describes EMC Corporation's NetWorker® backup/restore application as an example of the backup/restore application 130, the backup/restore application 130 may be any other backup/restore application which provides the backup/restore functionalities described in the Background section. The backup/restore application 130 may be EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and periodic operations for deduplicated and non-deduplicated backups. The core NetWorker® software backs up client file systems and operating system environment. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

FIG. 2 is a simplified example of a data store that stores virtual machines files, under an embodiment. The second file 122, or the second data store 122, stores data sets, or folders, for the virtual machines 112-118. These data sets, or folders, include a configuration file, a disk file, a ram file, and a log file for each of the virtual machines 112-118. For example, a third virtual machine configuration file 202, a third virtual machine disk file 204, a third virtual machine ram file 206, and a third virtual machine log file 208 comprise the data set, or the folder, which the second file 122, or the second data store 122, stores for the third virtual machine 116. FIG. 2 depicts an example of what the second file 122, or the second data store 122, may look like after the first data set 124 for the first virtual machine 112 and the second data set 126 for the second virtual machine 114 were restored to the second file 122, or the second data store 122, which already stored a third data set, or folder, for the third virtual machine 116 and a fourth data set, or folder, for the fourth virtual machine 118.

Figure 3:
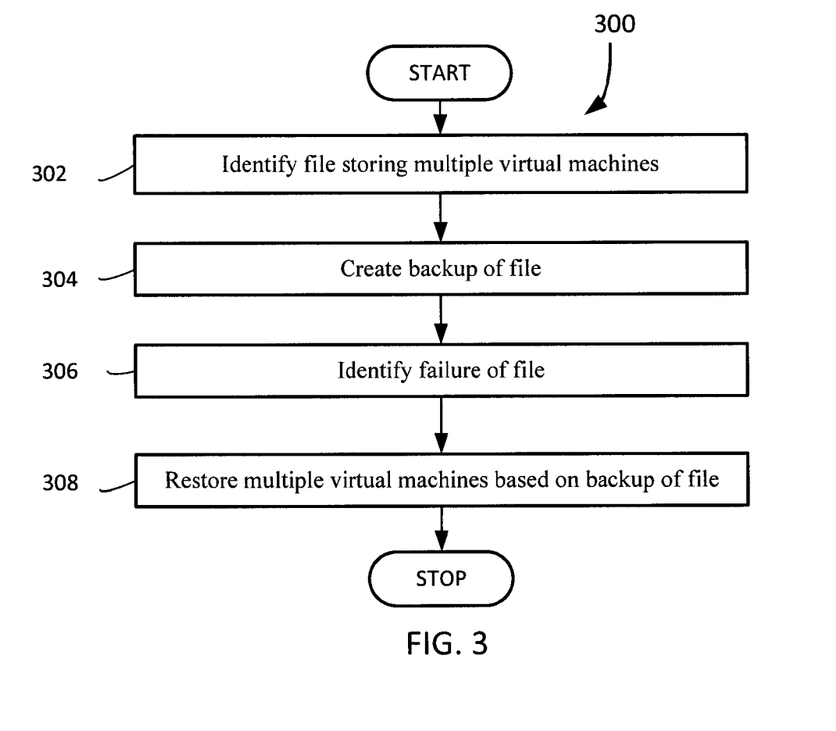
FIG. 3 is a flowchart that illustrates a method of backing up files storing virtual machines, under an embodiment.

FIG. 3 is a flowchart that illustrates a method for backing up files storing virtual machines, under an embodiment. Flowchart 300 illustrates method acts illustrated as flowchart blocks for certain steps involved in and/or between the clients 102-108 and/or the server 110 of FIG. 1.

A file storing multiple virtual machines is identified, block 302. For example, the backup and restore application 130 scans the storage bus for the fourth client 108 that manages the virtual machines 112-118, and identifies the first file 120, or the first data store 120, that stores the first data set 124 for the first virtual machine 112 and stores the second dataset 126 for the second virtual machine 114.

Having identified a file, a backup of the file is created, block 304. For example, the backup and restore application 130 creates backups of the first file 120, or the first data store 120, based on a user-defined policy by using change block tracking to create backup blocks for each of the changed blocks of the first data set 124 for the first virtual machine 112 and the second dataset 126 for the second virtual machine 114.

After backing up a file, a failure of the file is identified, block 306. For example, the backup and restore application 130 identifies a failure of the first file 120, or the first data store 120, based on file system corruption.

Once a file failure is identified, multiple virtual machines are restored based on a backup of the failed file, block 308. For example, the backup and restore application 130 responds to a single user click via the first client 102 by using the backup of the first file 120, or the first data store 120, stored in the copies of data sets 132 to restore the data sets 124-126 for the virtual machines 112-114 to the second file 122, or the second data store 122. Then the flowchart 300 restarts at block 302.

Although FIG. 3 depicts the blocks 302-308 occurring in a specific order, the blocks 302-308 may occur in another order. In other implementations, each of the blocks 302-308 may also be executed in combination with other blocks and/or some blocks may be divided into a different set of blocks.

Figure 4:
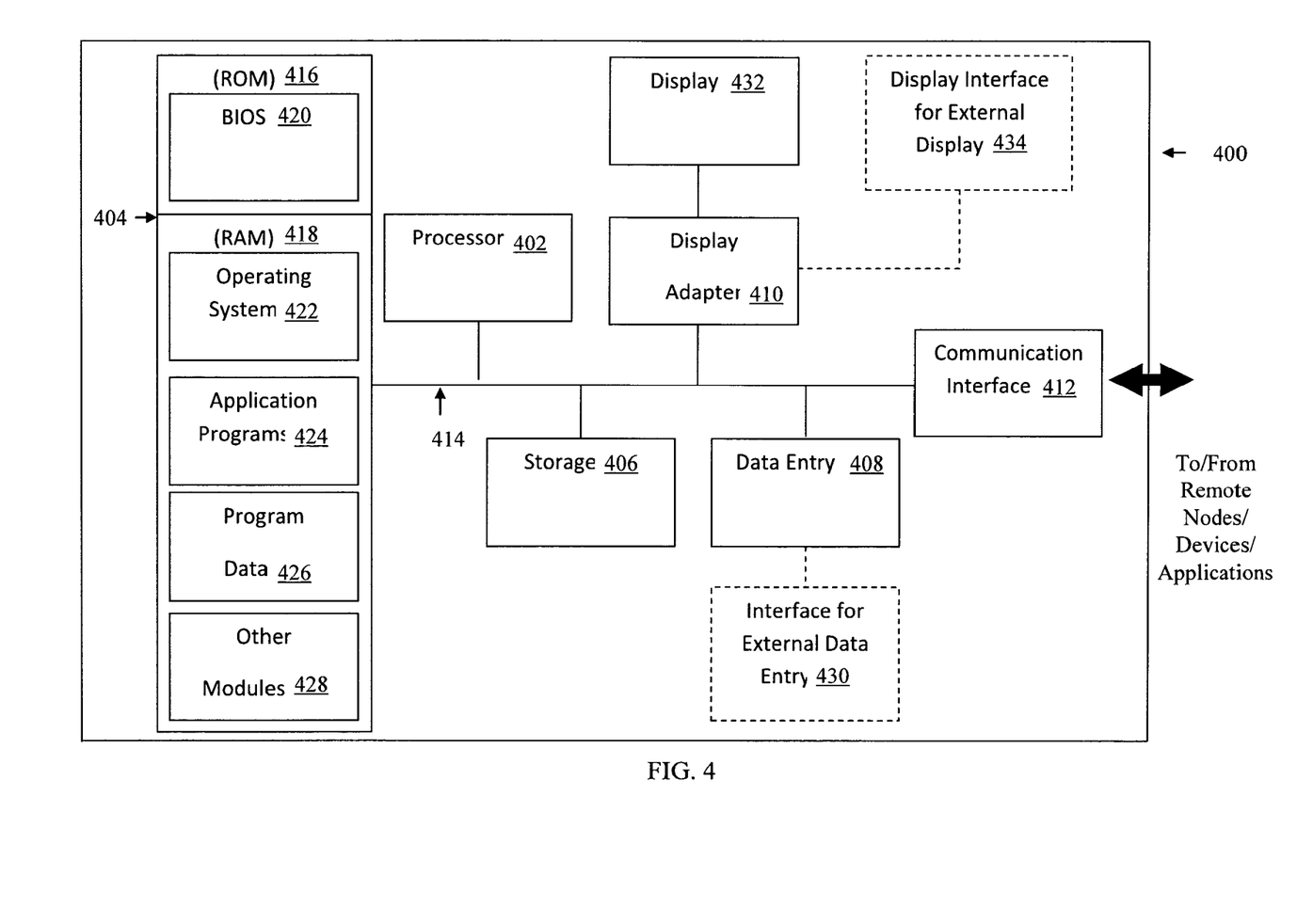
FIG. 4 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for backing up files storing virtual machines, the system comprising:
   a processor based application, which when executed on a computer, will cause the processor to:
      identify a single remote file storing a plurality of data sets corresponding to a plurality of virtual machines, the identified remote file being stored on a server that remotely manages the plurality of virtual machines, the remote file to be backed up;
      create a backup file of the identified remote file, the backup file storing the identified remote file's plurality of data sets corresponding to the plurality of virtual machines;
      after creation of the backup file of the identified remote file:
         identify a file failure of the identified remote file stored on the server that remotely manages the plurality of virtual machines; and
         restore all the data sets corresponding to the plurality of virtual machines included in the identified remote file stored on the server that remotely manages the plurality of virtual machines.

2. The system of claim 1, wherein causing the processor to identify the remote file that is to be backed up further causes the processor to scan a storage bus associated with the remote file.

3. The system of claim 1, wherein causing the processor to create the backup file further causes the processor to create, according to a user-defined policy, a plurality of backups corresponding to the plurality of data sets corresponding to the plurality of virtual machines.

4. The system of claim 1, wherein causing the processor to create the backup file further causes the processor to use change block tracking to create a backup block for a block which is identified as changed for one of the plurality of data sets corresponding to the plurality of virtual machines.

5. The system of claim 1, wherein causing the processor to restore the identified remote file based on the backup file further causes the processor to restore the plurality of data sets corresponding to the plurality of virtual machines stored in the backup file to at least one of: the identified remote file and another file.

6. The system of claim 5, wherein causing the processor to restore the plurality of data sets corresponding to the plurality of virtual machines to at least one of the identified remote file and the other file is in response to a single input via a user device.

7. The system of claim 1, wherein causing the processor to identify a failure of the identified remote file stored remotely from the plurality of virtual machines further causes the processor to:
   after creating the backup file:

identify a corruption of a data set, in the identified remote file, that corresponds to a first virtual machine included in the plurality of the virtual machines.

8. The system of claim 7, wherein causing the processor to restore the identified remote file based on the backup file s further causes the processor to:
in the response to identifying the corruption of the data set that corresponds to the first virtual machine:
restore all of the plurality of data sets in the identified remote file that correspond to each of the plurality of virtual machines based on all of the plurality of data sets stored in the backup file that correspond to each of the plurality of virtual machines.

9. The system of claim 7, wherein at least one of the data sets in the identified remote file that correspond to other virtual machines are accurately maintained concurrently with the corruption of the data set that corresponds to the first virtual machine.

10. A computer-implemented method for backing up files storing virtual machines, the method comprising:
identifying a single remote file storing a plurality of data sets corresponding to a plurality of virtual machines, the identified remote file being stored on a server that remotely manages the plurality of virtual machines, the remote file to be backed up;
creating a backup file of the identified remote file, the backup file storing the identified remote file's plurality of data sets corresponding to the plurality of virtual machines;
after creation of the backup file:
identifying a file failure of the identified remote file stored on the server that remotely manages the plurality of virtual machines; and
restoring the identified remote file stored on the server that remotely manages the plurality of virtual machines.

11. The method of claim 10, wherein identifying the remote file storing the plurality of data sets corresponding to the plurality of virtual machines comprises scanning a storage bus associated with the remote file.

12. The method of claim 10, wherein creating the backup file comprises creating, according to a user-defined policy, a plurality of backups corresponding to the plurality of data sets corresponding to the plurality of virtual machines.

13. The method of claim 10, wherein creating the backup file comprises using change block tracking to create a backup block for a block which is identified as changed for one of the plurality of data sets corresponding to the plurality of virtual machines.

14. The method of claim 10, wherein restoring the identified remote file based on the backup file comprises restoring the plurality of data sets corresponding to the plurality of virtual machines stored in the backup file to at least one of: the identified remote file and another file in response to a single input via a user device.

15. A computer program product, comprising a non-transitory computer-readable medium having a computer-readable program code embodied therein to be executed by one or more processors, the program code including instructions to:
identify a single remote file storing a plurality of data sets corresponding to a plurality of virtual machines, the identified remote file being stored on a server that remotely manages the plurality of virtual machines, the remote file to be backed up;
create a backup file of the identified remote file, the backup file storing the identified remote file's plurality of data sets corresponding to the plurality of virtual machines;
after creation of the backup file:
identify a file failure of the identified remote file stored on the server that remotely manages the plurality of virtual machines; and
restore the identified remote file stored on the server that remotely manages the plurality of virtual machines.

16. The computer program product of claim 15, wherein the program code including instructions to identify the remote file storing the plurality of data sets corresponding to the plurality of virtual machines further include instructions to scan a storage bus associated with the remote file.

17. The computer program product of claim 15, wherein the program code including instructions to create the backup file further include instructions to create a plurality of backups corresponding to the plurality of data sets corresponding to the plurality of virtual machines.

18. The computer program product of claim 15, wherein the program code including instructions to create the backup file further include instructions to create the backup file based on a user defined-policy.

19. The computer program product of claim 15, wherein the program code including instructions to create the backup file further include instructions to use change block tracking to create a backup block for a block which is identified as changed for one of the plurality of data sets corresponding to the plurality of virtual machines.

20. The computer program product of claim 15, wherein the program code including instructions to restore the identified file based on the backup file further include instructions to restore the plurality of data sets corresponding to the plurality of virtual machines stored in the backup file to at least one of: the identified remote file and another file in response to a single input via a user device.

* * * * *